J. VIDINA.
THREAD INTERCUTTING TOOL.
APPLICATION FILED SEPT. 19, 1907.
907,921.
Patented Dec. 29, 1908.
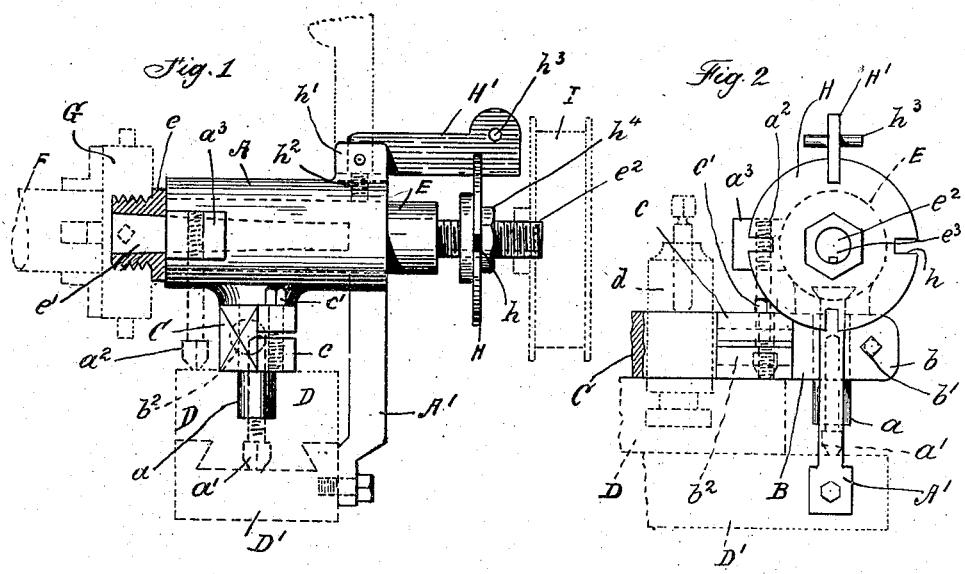
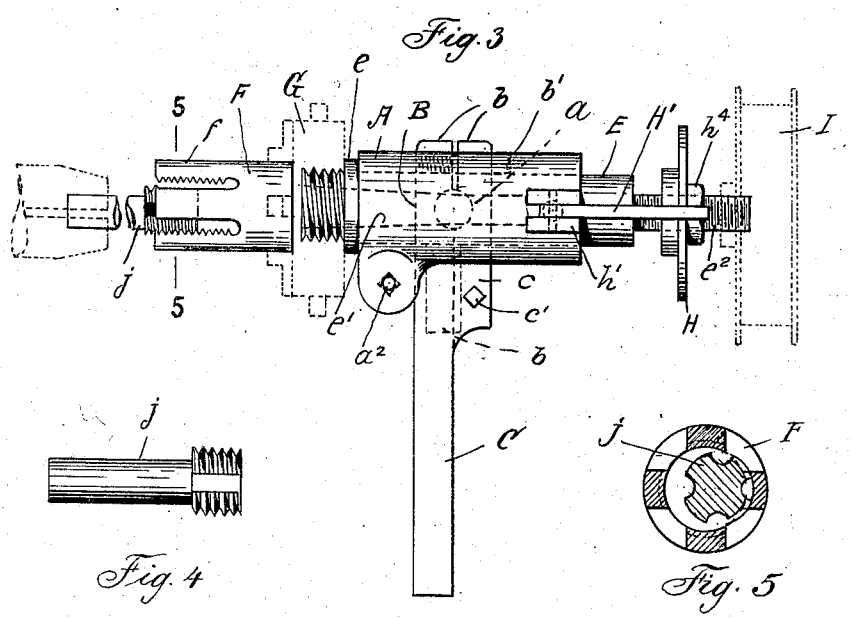
WITNESSES
INVENTOR
Joseph Vidina
By Robt. Klotz
Atty.

UNITED STATES PATENT OFFICE.

JOSEPH VIDINA, OF CHICAGO, ILLINOIS.

THREAD-INTERCUTTING TOOL.

No. 907,921.   Specification of Letters Patent.   Patented Dec. 29, 1908.

Application filed September 19, 1907. Serial No. 393,609.

*To all whom it may concern:*

Be it known that I, JOSEPH VIDINA, a subject of the Emperor of Germany, and residing at Chicago, in the county of Cook and State of Illinois, have invented a new and useful Improvement in Thread-Intercutting Tools, of which the following is a complete specification.

This invention relates to improvements in thread inter-cutting tools of that class employed to inter-cut the threads or provide cutting edges on a thread cutting die.

In forming thread cutting dies of that class in which the die is in the shape of a tube, split to provide a plurality of segments on which the cutting edges are formed, it has been customary to cut the threads on said segments of decreasing height from the forward edge of the segment to the rearward edge thereof, so as to provide the cutting edges at the forward edge. In large plants or machine shops a special machine is ofttimes employed for this purpose, but such machines are costly to build and can usually be employed but for the one purpose. In smaller plants it is customary to first thread the die and then cut away the threads from the rear edge or portion of the segments with an emery wheel or a file, but the operation is slow and it is difficult to construct a true die in such manner.

The object of this invention is to provide a very simple and cheaply constructed tool for inter-cutting the threads on a die so as to provide the cutting edges therefor and which can be attached to and operated in an ordinary lathe, such as is found in most work shops where such dies are employed or manufactured.

It is a further object of the invention to provide a device capable of inter-cutting the threads on each segment of the die in succession and at the same depth by a simple adjustment and without removing the die therefrom.

It is also an object of the invention to provide a device capable of use for cutting threads with the die when desired, or to be used for many other purposes for which a lathe is employed.

The invention consists of the matters hereinafter described in the specification and more fully pointed out and defined in the appended claims.

In the drawings: Figure 1 is a side elevation, partly in section, of a device embodying my invention. Fig. 2 is an end elevation of the same. Fig. 3 is a top plan view. Fig. 4 is a side elevation of the inter-cutting die. Fig. 5 is a section taken on line 5—5 of Fig. 3.

As shown in said drawings: A indicates a barrel or sleeve of metal or any other preferred material and provided on its under side with a stem $a$ to which a horizontally directed clamp B is attached. Said clamp comprises a head split to provide clamping jaws $b$ and having a bore therethrough for the reception of the stem $a$, and a bolt $b'$ passes through said jaws and clamps them about said stem. Extending from said clamp, from the side opposite said jaws, is an integral bolt or shaft $b^2$, shown in dotted lines in Figs. 1, 2 and 3, and to which is engaged a horizontally directed clamping arm C. Said clamping arm is provided at one end with a jaw $c$ adapted to engage the shaft $b^2$, and a bolt $c'$ passes therethrough and holds the jaw firmly upon said shaft. The clamping attachment thus formed provides means for adjusting the sleeve upon both a horizontal and a vertical pivot. Said clamping arm may be rigidly engaged to the cross slide D of a lathe in any preferred manner, as for instance, by a suitable clamp $d$, and an arm A', dove tailed at its upper end to the end of the sleeve A, extends downwardly from said sleeve and is bolted to the longitudinal slide D' of the lathe. A set screw or bolt $a'$ is engaged in the stem $a$ and extends downwardly therefrom and is seated on the slide D', and a set bolt $a^2$ is carried in a lug $a^3$ on the side of the sleeve A and extends downwardly and seats on the slide D. Said set bolts act to steady the device after it has been secured in place upon the lathe.

Rotatively and slidably engaged in the sleeve A is a mandrel E, which is provided on its forward end with an enlarged head $e$ adapted to abut against the end of the sleeve and limit the longitudinal movement of the mandrel in one direction. Any preferred means may be employed to secure the threading die F, which is to be operated upon, to the mandrel. As shown however the head $e$ is screw threaded and a clamp or chuck head G is engaged thereon and is adapted to grip said die. As shown also said mandrel is provided with a bore $e'$, and if preferred the clamp G may be carried on a shank adapted to be engaged in said bore. The rear end $e^2$ of said mandrel is reduced in size and screw threaded, and a disk H is slidably engaged thereon by means of a feather working in a groove $e^3$ in said end $e^2$. Said disk is provided in its periphery with a plurality of notches $h$ in which a locking blade H', pivoted in suitable ears $h'$ on the sleeve A, is adapted to engage and hold the mandrel from rotation, but permitting longitudinal movement thereof. A spring $h^2$ is seated in the sleeve A beneath the pivoted end of said blade and acts to hold it in adjusted position, and a cross pin $h^3$ is engaged in the other end of the blade and serves as a handle. A nut $h^4$ is engaged on said end $e^2$, outwardly from the disk H, and is adapted to permit said disk to be adjusted longitudinally of the mandrel. Any preferred means may be employed to rotate the mandrel, but, as shown in dotted lines, a belt pulley I is provided on the threaded end $e^2$.

The operation is as follows: The device is secured to the lathe in such position that the longitudinal axis of the mandrel is parallel with, but off center from, the longitudinal axis of the rotative chuck J of the lathe in which is carried the inter-cutting die $j$, which as shown is threaded at its end and grooved longitudinally of the threaded portion to provide the cutting edges therefor. The die F, having had its segments $f$ previously threaded, is secured to the mandrel and the mandrel is locked from rotation by means of the blade H' engaging in one of the notches of the disk H. The cutting die $j$ is of less diameter than the bore of the die F, and the mandrel is sufficiently off center with respect to the chuck to bring the inter-cutting die into cutting engagement with but one of the segments $f$ at a time. The mandrel is moved slightly longitudinally by hand so as to bring the threads of the inter-cutting die into engagement with the threads of the segment, where owing to the fact that the inter-cutting die is off center and is of less diameter than the internal diameter of the die F the threads on the former act to cut the threads of the segment deeper centrally thereof, and at the same time to draw the mandrel forwardly, thereby affording the feed. In other words the inter-cutting die acts to cut the inner face of the segment deeper at its center, so that the center of the segment is farther removed from the axis of the die than are the edges of the segment. When the inter-cut on one segment is completed the chuck is reversed, thereby returning the mandrel and bringing the inter-cutting die out of engagement with the segment. The blade H' is then raised and the mandrel rotated sufficiently to bring the next notch of the disk beneath the blade which is then lowered thereinto. This adjustment brings the next segment into register with the inter-cutting die and the operation is repeated.

If it is desired to use the die F for cutting threads on a bolt or the like, the blade H' is turned upwardly out of engagement with the disk and the mandrel rotated by means of the belt pulley.

The disk H is adjusted longitudinally of the mandrel to limit the length of the feed or cut and it is adapted to contact with the sleeve A when the cut is completed.

Obviously a device constructed in accordance with my invention affords a very simple and quickly acting thread inter-cutting tool and many details of construction and form may be varied without departing from the principles of my invention.

I claim as my invention:

1. In a device of the class described the combination with a sleeve of clamping means adapted to support the same in position, a mandrel in said sleeve adapted for longitudinal and rotative movement, a longitudinally adjustable disk on said mandrel arranged to abut the end of the sleeve and adapted to limit the longitudinal movement of the mandrel, and means adapted to engage with said disk and hold the mandrel from rotation.

2. In a device of the class described the combination with a sleeve of means adapted to support said sleeve in position, a longitudinally movable mandrel rotatively engaged in said sleeve, adjustable means on the mandrel adapted to limit the longitudinal movement thereof, and means pivotally engaged on said sleeve and adapted to engage said adjustable means and lock the mandrel from rotation.

3. In a device of the class described the combination with a sleeve of means supporting the same, a longitudinally and rotatably movable mandrel in said sleeve, a head on one end of said mandrel adapted to limit its longitudinal movement in one direction, a notched disk adjustably engaged on the other end of the mandrel and adapted to limit its longitudinal movement in the other direction, and a blade hinged on the sleeve and adapted to engage in said notches and hold the mandrel from rotation.

4. In a device of the class described the combination with a sleeve of means adjustably supporting the same, a mandrel in said sleeve adapted for both longitudinal and rotary movement and having a threaded end projecting from the sleeve, a disk slidably engaged on said end and adapted to abut against the sleeve and limit the longitudinal movement of the mandrel in one direction, means having threaded engagement on said end and adapted to hold said disk in adjusted position and means adapted to engage the disk and prevent rotation of the mandrel.

In witness whereof I have hereunto subscribed my name in the presence of two witnesses.

JOSEPH VIDINA.

Witnesses:
　JOE HILL,
　B. ZEITZ.